US011956482B2

(12) United States Patent
Lintz et al.

(10) Patent No.: US 11,956,482 B2
(45) Date of Patent: Apr. 9, 2024

(54) SYSTEMS AND METHODS FOR STORING AND DELIVERING CONTENT ASSETS

(71) Applicant: Comcast Cable Communications, LLC, Philadelphia, PA (US)

(72) Inventors: Christopher Lintz, Denver, CO (US); Jeremy Pfeifer, Highlands Ranch, CO (US)

(73) Assignee: COMCAST CABLE COMMUNICATIONS, LLC, Philadelphia, PA (US)

(*) Notice: Subject to any disclaimer, the term of this patent is extended or adjusted under 35 U.S.C. 154(b) by 0 days.

(21) Appl. No.: 16/930,807

(22) Filed: Jul. 16, 2020

(65) Prior Publication Data
US 2022/0021914 A1  Jan. 20, 2022

(51) Int. Cl.
H04N 21/231    (2011.01)
G11B 27/00     (2006.01)
H04N 21/6587   (2011.01)

(52) U.S. Cl.
CPC ..... *H04N 21/23106* (2013.01); *G11B 27/005* (2013.01); *H04N 21/6587* (2013.01)

(58) Field of Classification Search
None
See application file for complete search history.

(56) References Cited

U.S. PATENT DOCUMENTS

| 9,538,232 B2 * | 1/2017 | Carney | H04N 21/8456 |
| 10,165,331 B2 * | 12/2018 | Lo | H04N 21/632 |
| 10,412,450 B1 * | 9/2019 | Savarkar | H04N 21/4516 |
| 10,432,993 B2 * | 10/2019 | Nugent | H04N 21/4627 |
| 2002/0174430 A1 * | 11/2002 | Ellis | H04N 21/4751 725/46 |
| 2003/0149988 A1 * | 8/2003 | Ellis | H04N 21/2318 725/87 |
| 2009/0178070 A1 * | 7/2009 | Mitsuji | H04N 21/2541 725/4 |
| 2009/0178093 A1 * | 7/2009 | Mitsuji | H04N 21/6334 725/104 |
| 2011/0107365 A1 * | 5/2011 | Chen | H04N 21/2541 725/29 |
| 2011/0246621 A1 * | 10/2011 | May, Jr. | H04L 65/4084 709/219 |
| 2012/0099022 A1 * | 4/2012 | Sundy | H04N 21/4331 348/705 |
| 2013/0073669 A1 * | 3/2013 | Roberts | H04L 67/2852 709/214 |

(Continued)

*Primary Examiner* — An Son P Huynh
(74) *Attorney, Agent, or Firm* — BakerHostetler

(57) ABSTRACT

Delay in delivery of a content asset to a user device may be reduced by fetching a portion of the content asset and storing it in a cache. From the cache, segments of the portion of the content asset may be sent to the user device. An indication of a trickplay command associated with playback of the content asset on the user device may be received, such as a fast forward command, a rewind command, or a play command. Based on a type of the trickplay command, the portion of the content asset in the cache may be adjusted, such as by adjusting a time to live (TTL) of a segment of the content asset in the cache, by evicting a segment of the content asset in the cache, or by predictively pre-fetching and storing other segments to the cache.

20 Claims, 6 Drawing Sheets

(56) References Cited

U.S. PATENT DOCUMENTS

| | | | |
|---|---|---|---|
| 2014/0149533 A1* | 5/2014 | Bergman | H04L 67/2842 709/213 |
| 2014/0259082 A1* | 9/2014 | Broome | H04L 67/32 725/86 |
| 2015/0067722 A1* | 3/2015 | Bjordammen | G06Q 30/0253 725/32 |
| 2015/0244971 A1* | 8/2015 | Wickenkamp | H04N 5/782 386/295 |
| 2015/0281635 A1* | 10/2015 | Tang | H04N 5/76 386/295 |
| 2016/0014179 A1* | 1/2016 | Straub | H04L 65/602 709/217 |
| 2016/0365123 A1* | 12/2016 | Wang | H04N 21/234363 |
| 2018/0309840 A1* | 10/2018 | Zachman | H04L 65/602 |
| 2019/0005513 A1* | 1/2019 | Bennett | H04N 21/812 |
| 2019/0208263 A1* | 7/2019 | Chamberlin | H04N 21/44004 |
| 2019/0208277 A1* | 7/2019 | Lewis | H04N 21/2387 |
| 2020/0145701 A1* | 5/2020 | Liu | H04N 9/8205 |
| 2020/0267437 A1* | 8/2020 | Pantos | H04N 21/4621 |
| 2021/0037287 A1* | 2/2021 | Ha | H04N 21/4316 |

\* cited by examiner

SYSTEMS AND METHODS FOR STORING AND DELIVERING CONTENT ASSETS

BACKGROUND

Content management systems may store content assets on multiple storage devices. The content assets may comprise trick play versions of the content, such as fast forward and reverse playback video files. A user device may request one or more trickplay files associated with playback of a content asset from the content management system. Requested video files corresponding to the content asset may be requested from the storage devices and sent to the user device. However, the process of requesting and receiving portions of content assets from the storage device in response to trickplay commands may incur delays in playback of content assets, resulting in poor viewer experience.

SUMMARY

Delay in playback of a portion of a content asset requested by a user device may be reduced by prefetching the portion of the content asset from a storage device before it is requested. The prefetched portion of the content asset may be stored in an intelligent cache and may be adjusted based on one or more trickplay commands from the user device. The trickplay commands may comprise a fast forward command, a rewind command, a play command, a tune command, a pause command, and/or a stop command, as examples. Adjusting the portion of the content asset may comprise, adjusting a time to live (TTL) of the portion of the content asset, evicting at least a part of the portion of the content asset from the intelligent cache, predictively fetching, positioning and/or storing another portion of the content asset in the intelligent cache, as examples.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
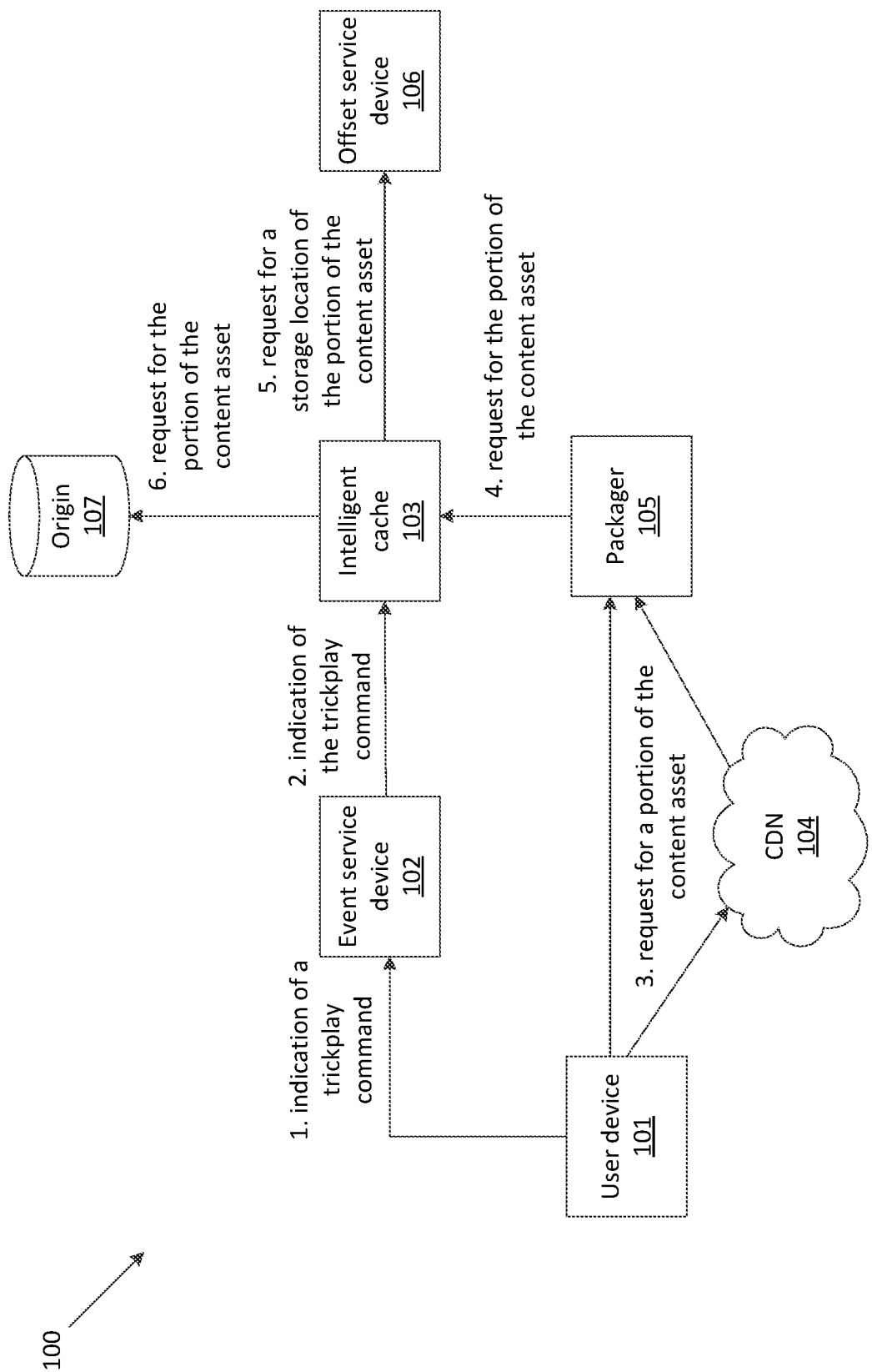
FIG. 1 shows an example system.

FIG. 1 shows an example system 100. The system 100 may comprise a content management system. The system 100 may comprise a system for storing and/or delivering content assets. A content asset may comprise video content, such as video for streaming (e.g., video on demand (VOD)), live linear video, etc. The content asset may be previously-recorded content, such as by a digital video recorder (DVR) and/or a cloud DVR. A content asset may comprise image content. A content asset may comprise audio content, such as an audio track to accompany a video and/or music.

The system 100 may comprise a user device 101. The user device 101 may comprise a playback device, such as a set-top box, a television, a laptop computer, a desktop computer, a tablet, or a mobile phone. The user device 101 may comprise a client device, such as a video on demand (VOD) client. The user device may comprise a DVR. The user device may comprise a client of a cloud DVR device and/or system.

The user device 101 may be configured to send an indication of a trickplay command (e.g., trickplay(assetID)). The trickplay command may be associated with a content asset. The trickplay command may be associated with a playback event and/or a user action, such as a user inputting a command and/or a selection to playback the content asset on the user device 101 and/or to alter playback of the content asset on the user device 101. The trickplay command may comprise a play command, a pause command, a tune command, a stop command, a fast forward command, a high speed fast forward command, or a rewind command, as examples.

The trickplay command may comprise an indication of a type of the trickplay command (e.g., play, pause, tune, stop, rewind, fast forward, etc.). The trickplay command may comprise a descriptor of the content asset, such as a title, an episode number, a playback time, etc.

An event service device 102 may be configured to receive the indication of the trickplay command from the user device 101. The event service device 102 may comprise a server, such as a backend server. The event service 102 may be configured to communicate with user devices 101 and forward communications from the user devices 101 to other devices configured to respond to the communications.

The event service device 102 may be configured to forward the indication of the trickplay command to an intelligent cache 103. The intelligent cache 103 may comprise memory, such as random-access memory (RAM). The intelligent cache may comprise a storage device. The intelligent cache may comprise a storage system. The intelligent cache may comprise a storage subsystem. The intelligent cache 103 may comprise a computing device, such as a server. The intelligent cache 103 may comprise a computing device comprising memory, a storage device, a storage system, and/or a storage subsystem. The intelligent cache 103 may comprise a computing device configured to communicate with memory, a storage device, a storage system, and/or a storage subsystem external to the computing device. The intelligent cache 103 may comprise a backend component.

The user device 101 may be configured to send a request for the content asset. The user device 101 may be configured to send the request for the content asset before, contemporaneous to, or after sending the indication of the trickplay command. The request for the content asset may comprise a request for a portion of the content asset, such as one or more segments of the content asset. The portion of the content asset may be associated with the trickplay command. For example, if the trickplay command is associated with a playback time of the content asset (e.g., a user fast forwarded to the playback time, the user paused at or before content at the playback time was output, the user pressed a "play" button at the playback time, etc.), the portion of the content asset be associated with the playback time. The user device 101 may be configured to continuously send requests for portions of the content asset as the content asset is output. For example, the user device 101 may request segments in an increasing order of the segments. The request may comprise a Hyper Text Transfer Protocol (HTTP) GET request. The request may comprise a typescript file. For example, the request may have a format similar to: GET/vod/assetID/segX.ts for VOD, where X is a number of a segment of the content asset that is being requested. The request may have a format similar to: GET/dvr/assetID/XBatchNumN.ts, where X is the number of the batch of the users recorded content where the content asset is stored and N is the number of the segment that is being requested.

A content distribution network (CDN) 104 may receive the request for the content asset from the user device 101. The CDN 104 may comprise one or more computing devices. The CDN 104 may comprise a distributed cluster of computing devices. The CDN 104 may be configured to determine if the content asset is stored in the intelligent cache 103. The CDN 104 may be configured to determine that the content asset is stored to the intelligent cache 103 based on communicating with a packager 105. The packager 105 may comprise a computing device and/or a network of computing devices. The packager 105 may be configured to determine that the content asset is stored in the intelligent cache 103 based on communicating with the intelligent cache 103.

Based on determining that the content asset is not stored in the intelligent cache 103 and/or that the requested portion of the content asset is not stored in the intelligent cache 103, the CDN 104 may be configured to forward the request for the content asset to the packager 105. Alternatively or additionally, the user device 101 may be configured to send the request for the content asset to the packager 105 (e.g., instead of to the CDN 104) based on the content asset comprising DVR content.

The packager 105 may comprise a server. The packager 105 may comprise a distributed network of servers. The packager 105 may be configured to prepare content assets for delivery to user devices 101. For example, the packager 105 may be configured to process, compress, and/or encrypt content assets. The packager 105 may be configured to receive the request for the content asset from the CDN 104.

Traditionally, the packager 105 may be configured to retrieve the requested content asset from the origin 107. However, according to an aspect of the present disclosure, the packager 105 may be configured to retrieve the requested content asset from the intelligent cache 103. The packager 105 may send a request to the intelligent cache 103 for the requested content asset.

The packager 105 may be configured to cause the content asset stored to the intelligent cache 103 to be send to the user device 101. The intelligent cache 103 may send the requested portion of the content asset to the packager 105. The packager 105 may send the requested portion of the content asset to the user device 101.

Sending content to the user device 101 from the intelligent cache 103 and/or retrieving content from the intelligent cache 103 may take significantly less time than sending content from an origin 107 to the user device 101 and/or retrieving the content from the origin 107. For example, sending a portion of a content asset to the user device 101 from the origin 107 may take 200-300 milliseconds. Sending the portion of the content asset to the user device 101 from the intelligent cache 103 may take 1-2 milliseconds.

The difference in time may be the result of time to retrieve content from the origin 107 compared to time to retrieve content from the intelligent cache 103. The origin 107 may comprise a disk, such as a spinning disk. The origin 107 may have natural delays, such as delays in head seek time, rotational delay, etc., which may delay delivery of content from the origin 107. The intelligent cache 103 may comprise memory. The intelligent cache 103 may not experience delays such as those exhibited by the origin 107.

If the requested portion of the content asset is not in the intelligent cache 103, the intelligent cache 103 may fetch and/or prefetch (e.g., retrieve, request, receive, etc.) the portion of the content asset. The intelligent cache 103 may be configured to determine the portion of the content asset to fetch and/or prefetch based on receiving the indication of the command and/or receiving the request for the content asset. Prefetching content may comprise requesting a portion of the content asset from the origin 107. Prefetching may comprise requesting a portion of the content asset that has not yet been requested by the user device 101. Prefetching a portion of the content asset may comprise storing the portion of the content asset in the intelligent cache 103 before it is requested by the user device 101. Prefetching may result in more efficient delivery of content to the user device 101, as a portion of the content asset that is already stored to the intelligent cache 103 can be sent to the user device 101 without the delay of requesting and receiving the portion from the origin 107.

The portion of the content asset may comprise one or more segments of the content asset. The portion of the of the content asset may comprise a range of segments of the content asset, such as a plurality of sequential segments. For example, the requested portion of the content may comprise a segment X. The intelligent cache 103 may determine to fetch and/or prefetch segments in the range X through X+Y where Y is a number of segments following segment X in a sequence of the segments. The segment X may be fetched and the other segments in the range X through X+Y may be the number of segments that the intelligent cache 103 prefetches.

The intelligent cache 103 may be configured to send a request for a storage location of the determined portion of the content asset. The intelligent cache 103 may be configured to send the request for the storage location to an offset service device 106. The request may comprise an HTTP GET request. For example, the request may have a format similar to: GET/offsets/assetID?start=X&ranges=Y, where X is the first segment in the range and Y is the last segment in the range. The offset service device 106 may comprise a server, such as a backend server. The offset service device 106 may be configured to determine sizes of the requested segments, such as their byte offsets. A byte offset may comprise a start offset and an end offset. The start offset may comprise a number of bytes "Z" relative to a beginning of the content asset at which the segment starts. The end offset may comprise a number of bytes "N" relative to the beginning of the content asset at which the segment ends.

The offset service device 106 may be configured to send an indication of the sizes of the requested segments, such as in bytes, to the intelligent cache 103. The offset service device 106 may be configured to send an indication of byte offsets of the requested segments to the intelligent cache 103. The byte offsets may comprise start offsets and/or end offsets. Start offsets may comprise byte numbers that indicate at which byte of the total bytes of the content asset a segment begins. End offsets may comprise byte numbers that indicate at which byte of the total bytes of the content asset a segment ends. The offset service device 106 may be configured to send an array of the byte sizes and/or byte offsets for the requested segments. The array of byte offsets may comprise a JavaScript Object Notation (JSON) block.

For example, the intelligent cache 103 may determine to fetch segments of the content asset in the range segment 1 through segment 4. The user device 101 may have requested segment 1. However, the intelligent cache 103 may determine to prefetch segments 2 through 4 in addition to segment 1. The intelligent cache 103 may determine to fetch segment 1 and to prefetch segments 2 through 4 based on the trickplay command and/or based on the type of the trickplay command. The intelligent cache 103 may send an indication of the range segment 1 through segment 4 to the offset service device 106. The offset service device 106 may respond by sending the intelligent cache 103 the following array of byte offsets for segments 1 through 4:

[0, 2011, 4452, 7004, 9322].

If the content asset comprises pre-stored content (e.g., recorded content such as DVR content), the offset service device 106 may respond with an array comprising a list and/or a dictionary of custom headers associated with the segments. The custom headers may be associated with the user device 101 and/or a user of device, for example. The custom headers may be used to retrieve the segments may indicate content that the user as recorded and/or stored, such as in the origin 107. The array may comprise byte offsets (e.g., starting offsets) associated with the segments. For example, the array may have the following example format:

```
[
    {
        "offset": 0,
        "headers": {
            "X-Batch-Num": 5
        }
    },
    {
        "offset": 2011,
        "headers": {
            "X-Batch-Num": 1
        }
    }
]
```

Based on receiving the array of byte offsets for the requested segments, the intelligent cache 103 may be configured to generate a record. The intelligent cache 103 may be configured to store the record, such as in the intelligent cache 103. The record may comprise an indication of the requested segments, their start offsets, their ends offsets, their sizes, and/or their custom headers (e.g., for DVR content). For example, based on the example array, the intelligent cache 103 may generate a record having the following example format and content:

| Segment | Start Offset | End Offset | Size (bytes) |
|---|---|---|---|
| 1 | 0 | 2010 | 2010 |
| 2 | 2011 | 4451 | 2440 |
| 3 | 4452 | 7003 | 2551 |
| 4 | 7004 | 9322 | 2278 |

The intelligent cache 103 may be configured to fetch and/or prefetch (e.g., request, retrieve, receive, etc.) the segments from the origin 107. Fetching and/or prefetching the segments may comprise sending an indication of the array of byte offsets, such as to the origin 107. The request sent to the origin 107 may comprise an HTTP GET request. For example, the request may have a format similar to: GET/assetIDRange Range: bytes=Z–N, where Z is the first starting offset byte in the range of segments and N is the last ending offset byte in the range of segments. The origin 107 may be configured to locate the requested segments, such as using the byte offsets.

The origin 107 may be configured to send the segments to the intelligent cache 103. The intelligent cache 103 may be configured to store the segments in the intelligent cache 103. The intelligent cache 103 may store storage locations of the segments (e.g., uniform resource locators (URL's)) in the intelligent cache 103. The storage locations may be stored in the intelligent cache 103 without the segments. However, storing the segments in the intelligent cache 103 may facilitate faster delivery of content than would storing the storage locations in the intelligent cache 103, as the segments would already be in the intelligent cache 103 and would not need to be retrieved from the storage locations. The segments may have a time to live (TTL). The TTL may indicate a time that the segments should be evicted from the intelligent cache 103. The TTL may be determined by the intelligent cache 103, by another device, and/or be predetermined. The TTL and/or an initial TTL (e.g., that is set for a segment when it is initially fetched and/or prefetched) may be determined by the intelligent cache 103, by another device, and/or be predetermined. For example, the intelligent cache 103 may be configured to have a default TTL value. The intelligent cache 103 may adjust the TTL value, such as based on trickplay commands.

The intelligent cache 103 may be configured to send one or more of the segments to the packager 105. The packager 105 may be configured to send one or more of the segments to the user device 101 from the intelligent cache 103. For example, the packager 105 may be configured to send a first segment of the segments to the user device 101. The packager 105 may be configured to send a requested segment to the user device 101 (e.g., segment 1 in the example above). The packager 105 may be configured to send another segment of the segments to the user device 101 after a period of time, such as a playback duration of the sent segment, has elapsed.

The intelligent cache 103 may be configured to adjust portions of the content asset stored in the intelligent cache 103. The intelligent cache 103 may be configured to adjust the portions of the content asset based on a type of the trickplay command. A type of a trickplay command may comprise a play command, a stop command, a pause command, a tune command, a fast forward command, a high speed fast forward command, a rewind command (e.g., a short rewind, a long rewind, etc.). The intelligent cache 103 may be configured to adjust the portions of the content asset stored in the cache based on a probability that the portions of the content asset will be played back by the user device 101. Adjusting the portions of the content asset may comprise decreasing the TTL of the segments from the intelligent cache. Decreasing the TTL of the segments from the intelligent cache may comprise evicting segments from the intelligent cache 103. Adjusting the portions of the content asset may adjusting the TTL of one or more of the segment. Adjusting the portions of the content asset may comprise prefetching additional portions of the content asset.

The intelligent cache 103 may be configured to evict a segment that has been sent to the user device 101 and/or the packager 105. Before evicting the segment that has been sent to the user device 101 and/or the packager 105, the intelligent cache 103 may be configured to determine next segments of the content asset to request, such as a range of segments and to request offsets for the determined segments from the offset service device 106. For example, before evicting segment 4, the intelligent cache 103 may request offsets for segments 5 through 8 from the offset service device 106.

Based on receiving the offsets for the next segments, the intelligent cache 103 may be configured to fetch and/or prefetch the next segments from the origin 107, such as by requesting the offset ranges received from the offset service for the next segments. The intelligent cache 103 may be configured to add the offsets for the next segments to the record of segments.

Although the examples given described fetching and/or prefetching four segments at a time, other numbers of segments and/or sizes of portions of a content asset may be fetched and/or prefetched. The number of segments and/or size of portions of content assets that may be fetched and/or prefetched may be based on a storage size of the intelligent cache 103. The number of segments and/or size of portions of content assets that may be fetched and/or prefetched may be based on user behavior. For example, the intelligent cache 103 may not determine any trickplay commands for a time period. The last determined trickplay command may have comprised a "play" command. Based on the last determined trickplay command comprising a "play command" and not determining a subsequent trickplay command, the intelligent cache 103 may determine that a user is watching a content asset. Based on the time that the user watches the content asset without sending a trickplay command increasing, the number of segments and/or size of portions of content assets that may be fetched and/or prefetched may be determined to increase.

Figure 2:
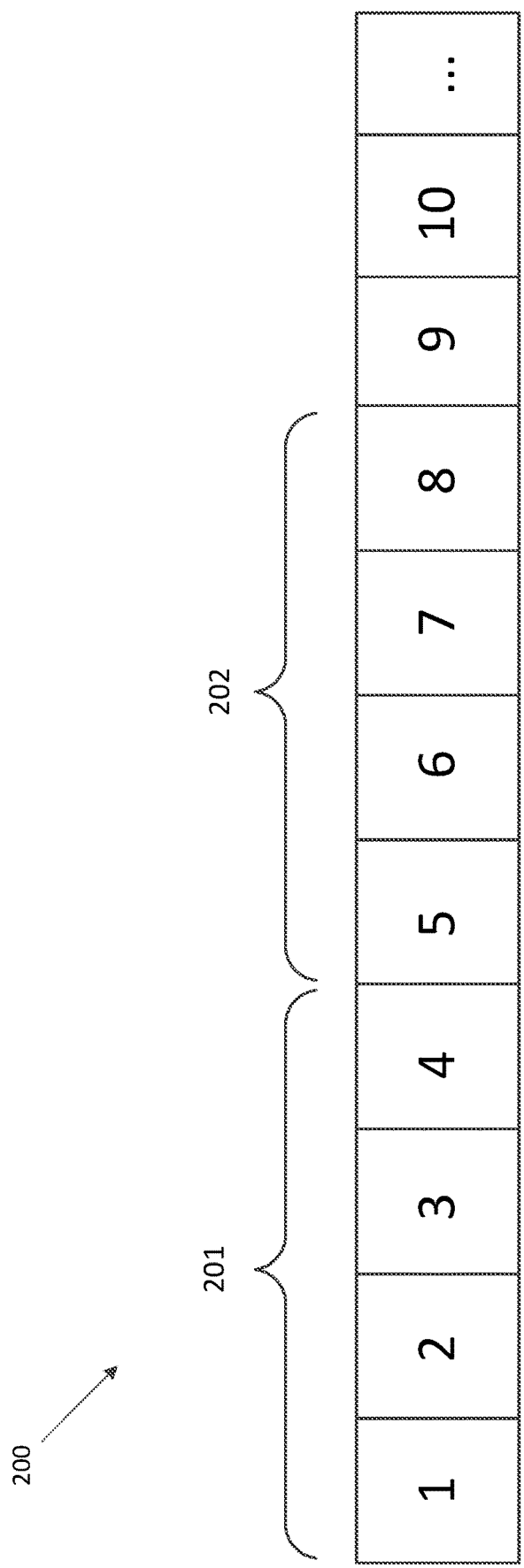
FIG. 2 shows an example portion of a content asset.

FIG. 2 shows an example portion of a content asset 200. The portion of the content asset 200 may comprise ranges 201, 202 of segments of the content asset. Based on a trickplay command associated with playback of the content asset on a user device (e.g., user device 101 in FIG. 1), the ranges 201, 202 may be determined. For example, a first range 201 comprising segments 1 through 4 may be determined. A second range 202 comprising segments 5 through 8 may be determined. The ranges of segments 201, 202 may be determined by an intelligent cache (e.g., intelligent cache 103 in FIG. 1).

A byte size and/or byte offset of the segments in the ranges 201, 202 may be determined. For example, an indication of the ranges 201, 202 may be sent to an offset service device (e.g., offset service device 106 in FIG. 1), such as by the intelligent cache. The offset service device may return the byte sizes and/or the byte offsets of the segments in the ranges 201, 202, such as to the intelligent cache. The byte sizes and/or the byte offsets may be sent as an array comprising segment numbers, segment start offsets, segment end offsets, and/or segment sizes.

The segment numbers, segment start offsets, segment end offsets, and/or segment sizes may be stored, such as by the intelligent cache. The segment numbers, segment start offsets, segment end offsets, and/or segment sizes may be stored as a block, such as a JSON block.

The segments in the ranges 201, 202 may be fetched and/or prefetched. The segments in the ranges 201, 202 may be fetched and/or prefetched by sending an indication of the segment numbers, start offsets, end offsets, and/or sizes of the segments. The segments in the ranges 201, 202 may be fetched and/or prefetched by sending an indication of block of the segments. The segments in the ranges 201, 202 may be fetched and/or prefetched from an origin (e.g., origin 107 in FIG. 1), such as by the intelligent cache.

The segments in the ranges 201, 202 may be stored in the intelligent cache. The segments may be stored in the intelligent cache with an indication of a TTL for the segments. The segments may be sent from the intelligent cache to a packager (e.g., packager 105 in FIG. 1). The segments may be sent to the user device.

Figure 3:
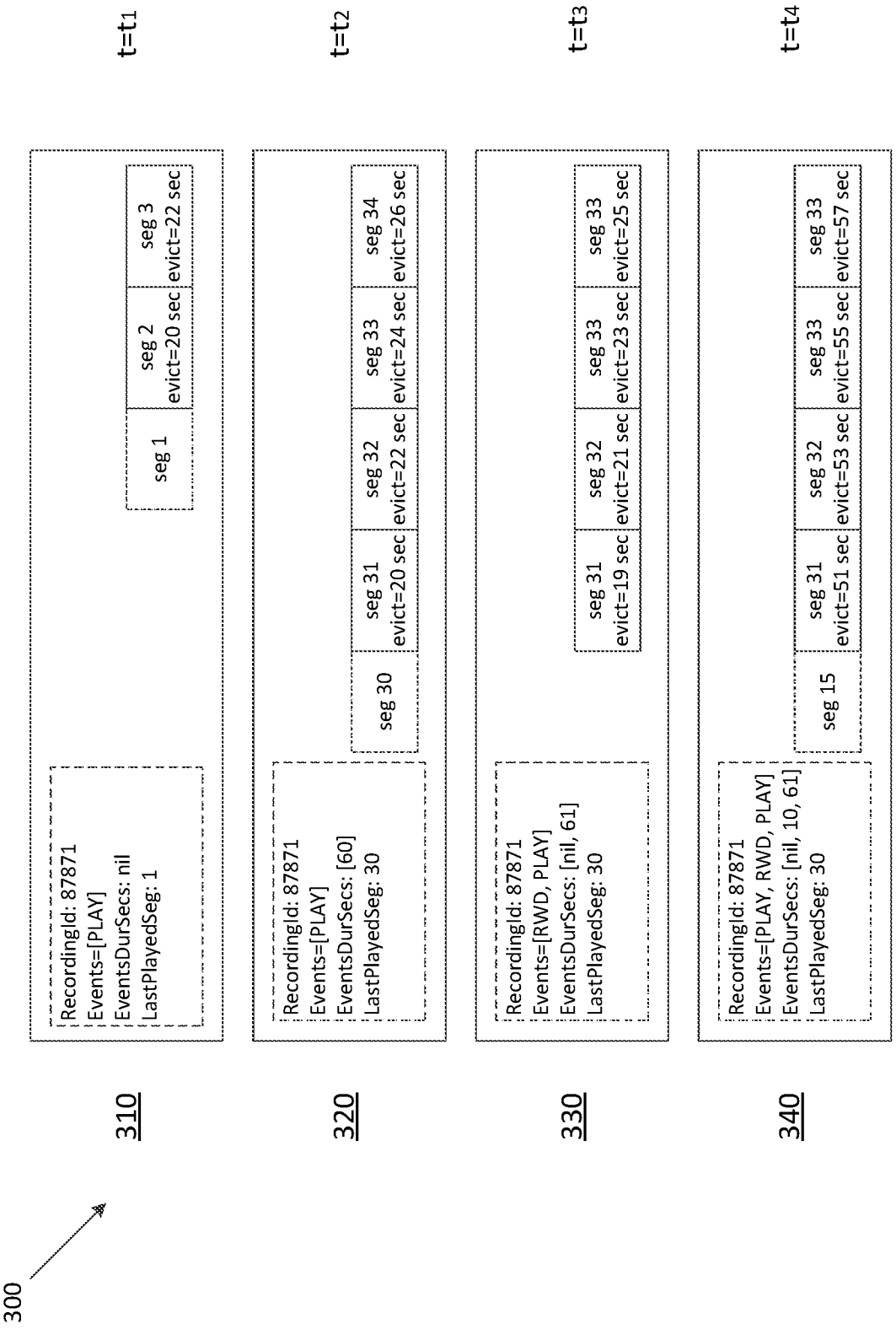
FIG. 3 shows an example intelligent cache.

FIG. 3 shows an example intelligent cache 300 at example stages of a process. The intelligent cache 300 may be similar to the intelligent cache 103 in FIG. 1. Step 310 shows the intelligent cache 300 at a time t1. A trickplay command associated with a user device (e.g., user device 101 in FIG. 1) may be received. The trickplay command may be associated with a segment (e.g., segment 1) of a content asset. The segment may be fetched and stored in the intelligent cache 300. Other segments may be prefetched and stored to the intelligent cache 300. For example, the segment associated with the trickplay command, segment 1, and two other segments (e.g., segments 2 and 3) may be fetched and/or prefetched. The other segments may comprise segments following the segment associated with the trickplay command in a sequence of segments of the content asset, such as the next two segments after the requested segment.

Segments may be sent from the intelligent cache 300 to a packager (e.g., packager 105 in FIG. 1). For example, segment 1 may be sent to the packager. The packager may send the segments to the user device. Based on a segment being sent to the user device, the segment may be evicted from the intelligent cache 300.

Step 320 shows the intelligent cache 300 at a time t2. At the time t2, the user device may have played back the content asset for a period of time, such as one minute. The user device may have played back the content asset uninterrupted (e.g., without any trickplay commands). As the user device played back the content asset, more segments may have been fetched and/or prefetched and stored in the intelligent cache 300, sent to the user device, and/or evicted from the intelligent cache 300.

Based on the user device having played back the content for the period of time, it may be determined that it is probable that the user device will continue to playback the content asset. Based on the determination that it is probable that the user device will continue to playback the content asset, instead of storing three segments of the content asset to the intelligent cache 300 at a time, four segments of the content asset may be stored in the intelligent cache 300 at a time.

Step 330 shows the intelligent cache 300 at a time t3. At the time t3, an indication of a trickplay command may be received. The trickplay command may comprise a rewind command. The rewind command may be received from the user device after a segment stored in the intelligent cache 300 is sent to the user device. For example, the rewind command may be received one second after a segment 30 was sent to the user device. Based on the rewind command, no further segments may be stored in the intelligent cache and/or evicted from the intelligent cache until a subsequent playback event occurs.

Step 340 shows the intelligent cache 300 at a time t4. At the time t4, another trickplay command may be received. The trickplay command may comprise a play command. The play command may be received a period of time after receiving the rewind command. For example, the play command may be received 10 seconds after the rewind command was received. The period of time may comprise a duration of a rewind event.

The play command may be associated with a segment of the content asset. For example, the play command may be associated with segment 5. A time gap between a playback time associated with the segment associated with the play command and a playback time of the next segment to be send to the user device before the rewind command may be determined. For example, there may be a playback time of 32 seconds between segment 15 and segment 31.

The TTL of one or more segments stored in the intelligent cache 300 may be adjusted. For example, the TTL may be increased. The TTL may be increased by an amount equal to the period of time between the play command and the rewind command. For example, if the period of time between the play command and the rewind command is 10 seconds, the TTL of one or more segments stored in the intelligent cache may be increased by 10 seconds.

The TTL may be increased by an amount equal to the time gap between the playback time of the requested segment and the next segment at the rewind event. For example, if the gap in playback times is 32 seconds, the TTL of one or more of the segments stored in the intelligent cache may be increased by 32 seconds.

Figure 4:
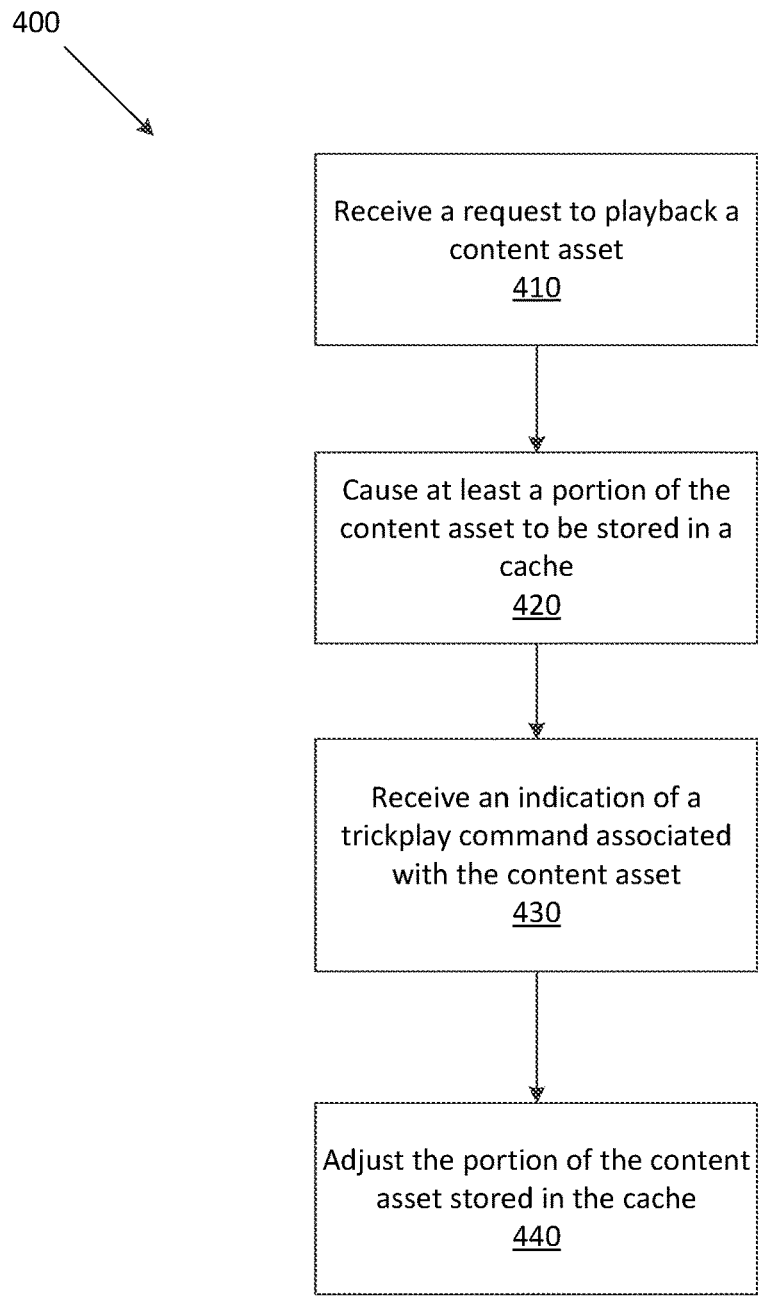
FIG. 4 shows an example method.

FIG. 4 shows an example method 400. At step 410, a request to playback a content asset may be received. The request may be received from a user device (e.g., the user device 101 in FIG. 1). The request may be received by a computing device (e.g., the packager 105 in FIG. 1). The request may be associated with a portion of the content asset, such as a segment of the content asset. The request may comprise a request to start playing a content asset (e.g., a "new" content asset that was not being played back by the user device).

At step 420, at least a portion of the content asset may be caused to be stored in an intelligent cache. The portion of the content asset may be caused to be stored in the intelligent cache by the computing device. The portion of the content asset may be caused to be stored in the intelligent cache by another computing device and/or by the intelligent cache (e.g., the intelligent cache 103 in FIG. 1). The portion of the content asset may comprise the portion of the content asset associated with the request. The portion of the content asset may comprise the portion of the content asset associated with the request and another portion of the content asset, such as described in FIG. 4.

Causing the portion of the content asset to be stored in the intelligent cache may comprise determining the portion of the content asset. Causing the portion of the content asset to be stored in the intelligent cache may comprise requesting byte sizes and/or byte offsets of the portion of the content asset, such as from an offset service device (e.g., offset service device 106 in FIG. 1). Causing the portion to be stored in the intelligent cache may comprise fetching and/or prefetching the portion of the content asset from a storage device (e.g., origin 107 in FIG. 1). Fetching and/or prefetching the portion of the content asset may comprise sending an indication of the byte sizes and/or byte offsets. Causing the portion of the content asset to be stored in the intelligent cache may comprise storing the portion of the content asset, a TTL associated with the portion of the content asset, and/or the byte sizes and/or byte offsets in the intelligent cache.

At step 430, an indication of a trickplay command associated with the content asset may be received. The indication of the trickplay command may be received from the user device. The indication of the trickplay command may be receive by an event service device (e.g., event service device 102 in FIG. 1). The trickplay command may comprise a fast forward command, a high speed fast forward command, a stop command, a tune command, a rewind command, a long rewind command, a short rewind command, a pause command, and/or a play command, as examples. The trickplay command may follow another trickplay command, such as a play command following a fast forward command and/or a rewind command.

At step 440, the portion of the content asset stored in the intelligent cache may be adjusted. The portion of the content asset may be adjusted by the intelligent cache. The portion of the content asset may be adjusted based on a type of the trickplay command (e.g., fast forward, high speed fast forward, stop, tune, rewind, long rewind, short rewind, pause, and/or play, etc.). The portion of the content asset may be adjusted based on a type of the most recent trickplay command.

If two or more trickplay commands are received, the portion of the content asset may be adjusted based on a time period between the trickplay commands and/or a playback time gap between segments of the content asset associated with the trickplay commands.

The portion of the content asset may be adjusted based on a probability of playback of the portion of the content. The probability of the playback of the portion of the content may be determined based on the type of the trickplay command. For example, it may be determined that playback of the portion is probable based on a play command. The probability may be based on a period of time after the trickplay command, such as an uninterrupted period of time (e.g., absent other trickplay commands). For example, if the content is played on the user device for three minutes or more without interruption, it may be determined that it is probable that the portion of the content will be played back by the user device.

Adjusting the portion of the content asset stored in the intelligent cache may comprise increasing a TTL of one or more segments of the content asset stored in the intelligent cache. Adjusting the portion of the content asset may comprise deleting one or more segments of the content asset stored in the intelligent cache. Adjusting the portion of the content asset may comprise storing other segments of the content asset in the intelligent cache. Adjusting the portion of the content asset may comprise one or more of the operations shown in FIG. 4.

For example, the trickplay command may comprise a rewind command followed by a play command. Based on a time between the rewind command and the play command, the trickplay command may be considered a short rewind or a long rewind. Based on the trickplay command comprising a short rewind command, the TTL of one or more segments of the content asset in the intelligent cache may be increased. Based on the trickplay command and a previously received trickplay command, one or more segments of the content asset in the intelligent cache may be adjusted. Based on the trickplay command comprising a long rewind command, the TTL of one or more segments of the content asset in the intelligent cache may be decreased. Based on the trickplay command comprising a long rewind command, one or more segments of the content asset in the intelligent cache may be evicted from the intelligent cache. Evicting the segments from the intelligent cache may make more storage space in the intelligent cache available for storage of other segments and/or content assets.

For example, the trickplay command may comprise a fast forward command. Based on the fast forward command, another portion of the content asset may be stored in the intelligent cache. The trickplay command may comprise the fast forward command followed by a play command. The other portion of the content asset may comprise a portion of the content asset associated with a playback time before a playback time associated with the play command.

Figure 5:
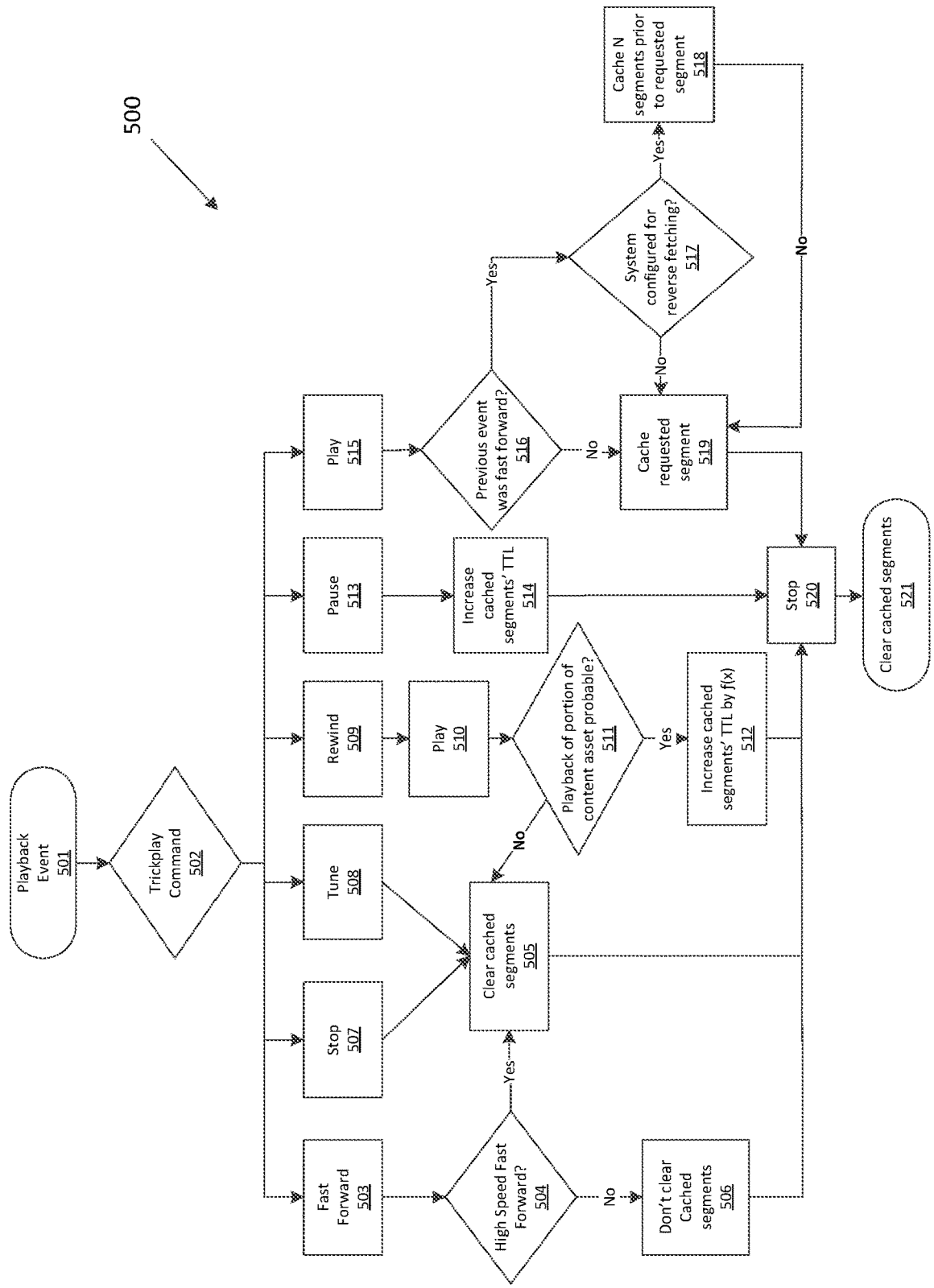
FIG. 5 shows an example method.

FIG. 5 shows an example method 500. At step 501, a playback event may occur. The playback event may be executed on a user device (e.g., user device 101 in FIG. 1). The playback event may be associated with playback of a content asset on the user device. The content asset may be playing on the user device. At least a portion of the content asset may be stored in an intelligent cache (e.g., the intelligent cache 103 in FIG. 1) in a content management system (e.g., system 100).

The playback event may comprise a user action, such as a pressing of a button, input of a voice command, and/or a selection of a trickplay option (e.g., via a control device and/or a menu on a display). The playback event may be indicative of a trickplay command.

At step 502, the trickplay command may be received. The trickplay command may be sent by the user device, such as based on the playback event. The trickplay command may be received by another device in the content management system. The device may determine a type of the trickplay command.

As shown in step 503, the type of the trickplay command may be determined to be a fast forward command. A fast forward command may comprise a command to perform a fast forward operation. A fast forward operation may comprise playing of content at a speed faster than its normal playback speed. A fast forward command may comprise a command to skip from a playback time of a content asset to a latter playback time of the content asset.

At step 504, it may be determined whether the fast forward command comprises a high speed fast forward command. A high speed fast forward command may comprise a command to play content and/or to skip to a playback time in a content asset at a speed faster than a normal fast forward operation.

Based on the fast forward command comprising a high speed fast forward command, a portion of the content asset stored in the intelligent cache may be evicted (e.g., cleared, erased, deleted, etc.), as shown in step 505. If a plurality of segments of the content asset are stored in the intelligent cache, one or more of the segments may be evicted from the intelligent cache.

The portion of the content asset to be evicted from the intelligent cache may be determined based on the speed of the fast forward command. For example, more segments of the content asset may be evicted based on the fast forward command being comprising a high speed fast forward command.

The portion of the content asset to be evicted from the intelligent cache may be determined based on a starting point of the fast forward command. The starting point of the fast forward command may comprise a playback time and/or a segment of the content asset at which the user selected a fast forward option. The portion of the content asset to be evicted from the intelligent cache may be determined based on a stopping point of the fast forward command. The stopping point of the fast forward command may comprise a playback time and/or a segment of the content asset at which the user selected a play option and/or stopped the fast forwarding event.

Based on the fast forward command not comprising a high speed fast forward command, the portion of the content asset may not be evicted from the intelligent cache, as shown in step 506. The portion of the content asset may be evicted at a time based on a TTL of the portion of the content in the intelligent cache.

Additionally or alternatively, it may be determined that one or more segments comprise a commercial or other content. Based on the fast forward command, the commercial or other content may be evicted from the intelligent cache. Based on the fast forward command, the TTL of the commercial or other content may be decreased.

As shown in step 507, the type of the trickplay command may be determined to be a stop command. The stop command may comprise a command to perform a stop operation. The stop operation may comprise terminating playback of a content asset. The stop command may follow a play command and/or playback of a content asset. Based on the stop command, a portion of the content asset in the intelligent cache may be evicted, as shown in step 505.

As shown in step 508, the type of the trickplay command may be determined to be a tune command. The tune command may comprise a command to play a different content asset or a different portion of the content asset. For example, a user may want to play a different episode of a television show. Based on the tune command, a portion of the content asset in the intelligent cache may be evicted, as shown in step 505.

As shown in step 509, the type of the trickplay command may be determined to be a rewind command. The rewind command may comprise a command to perform a rewind operation. The rewind operation may comprise playing back content in a reverse order. For example, frames of the content may be played back in a reverse order with respect to their playback sequence. The rewind operation may comprise skipping to a portion of the content asset having a playback time earlier than a portion of the content that was output when the rewind operation began.

As shown in step 510, the rewind command may be followed by a play command. As shown in step 511, based on the rewind command being followed by the play command, a probability may be determined. The probability may comprise a probability that a portion of the content asset stored in the intelligent cache will be played back by the user device may be determined. The probability may be determined based on a gap between the rewind command and the play command. The gap may comprise a difference in playtime between a playtime at which the rewind was started and a playtime at which the rewind was stopped and/or the content asset was played. The gap may comprise a number of segments between a segment that was output when the rewind started and a segment that was output when the rewind stopped and/or the content asset was played.

The probability that the portion of the content asset will be played back may be determined based on whether the gap satisfies a threshold. The threshold may be a duration of time or a number of segments. The threshold value may be predetermined. If the gap satisfies the threshold, it may be determined that it is improbable that the portion of the content asset will be played back by the user device. Based on the improbability of the portion of the content asset being played back by the user device, the portion of the content asset may be evicted from the intelligent cache, as shown in step 505.

If the gap does not satisfy the threshold, it may be determined that it is probable that the portion of the content asset will be played back by the user device. Based on it being probable that the portion of the content will be played back by the user device, the TTL of a portion of the content asset in the intelligent cache may be increased, as shown in step 512. The TTL may be increased by f(x), which may be the sum of a duration of the gap between the rewind and the play commands, a duration between a playback time of the content at a time of the rewind and a playback time of the content at a time of the play command, and a duration of a new segment. The new segment may comprise a segment associated with a playback time at which the play command was received.

As shown in step 513, the type of the trickplay command may be determined to be a pause command. A pause command may comprise a command to perform a pause operation. The pause operation may comprise output of a frame or a portion of the content asset associated with a playback time until another command is received.

As shown in step 514, based on the pause command, a TTL of a portion of the content asset in the intelligent cache may be increased. The TTL may be increased based on a duration of a pause operation caused by the pause command. For example, every five minutes that the content asset is paused, the TTL may be increased. The TTL may be increased based on a determination that playback of the content asset is probable based on the pause command. It may be determined that playback of the portion of the content asset is probable based on a duration of the pause operation. For example, if the content asset is paused for three minutes or more, it may be determined that playback of the content asset is probable and the TTL may be increased.

As shown in step 515, the type of the trickplay command may be determined to be a play command. The play command may comprise a command to perform a play operation. The play operation may comprise playback of a content asset at a normal speed. The play command may comprise playback of a video portion of the content asset and an audio portion of the content asset associated with the video portion. The play command may request a segment of the content asset. For example, the user may press a "play" button at a certain segment of the content asset or at a certain playback time of the content asset.

As shown in step 516, it may be determined whether the play command was received after receiving a fast forward command. If the play command is received after receiving a fast forward command, it may be determined whether the system is configured for reverse fetching, as shown in step 517. The system may be configured for reverse fetching based on how it was configured when the system was deployed. If the system is configured for reverse fetching, N segments prior to the segment requested by the play command of the content asset may be stored in the intelligent cache, as shown in step 518. The number of segments N may be a fixed number. The fixed number may be preconfigured, such as by engineers. Based on a marker in the asset content indicating a start and/or end of a commercial, such as a SCTE35 marker, it may be determined how far back the commercial is (e.g., 4 segments). The intelligent cache may reverse fetch the segments that go back to the commercial.

If the play command is not received after receiving a fast forward command, the segment of the content asset requested by the play command may be stored in the intelligent cache, as shown in step 519. If the play command is received after receiving a fast forward command, but it is determined that the system is not configured for reverse fetching, the requested segment may be stored in the intelligent cache.

As shown in step 520, a trickplay command comprising a stop command may be received. The stop command may be received after one or more of the other trickplay commands. Based on the stop command, the content asset may be evicted from the intelligent cache, as shown in step 521.

Figure 6:
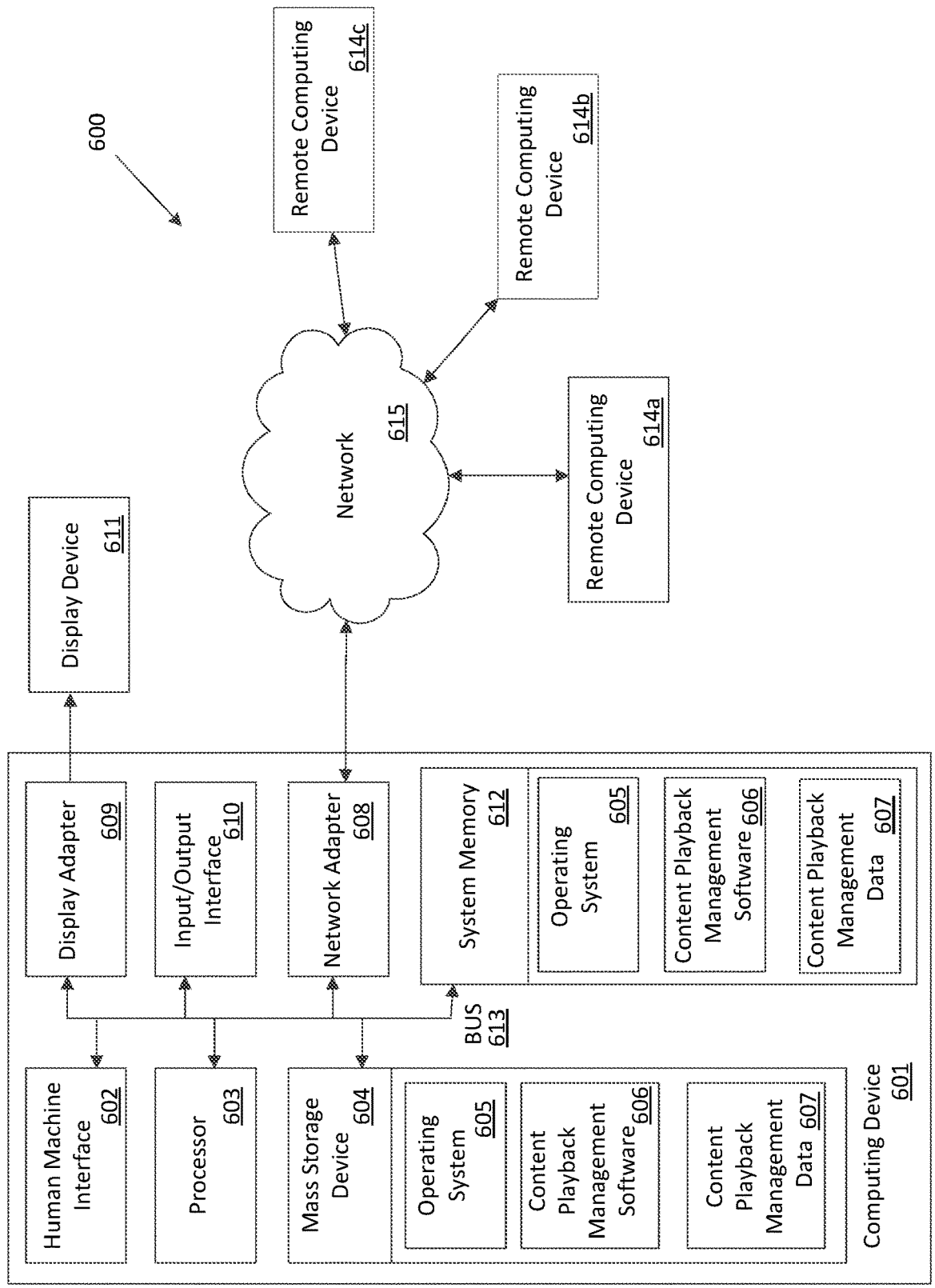
FIG. 6 shows an example computing system.

FIG. 6 shows an example system 600. The system 600 may comprise a computing device 601. The computing device 601 may comprise one or more of the devices in FIG. 1, such as the intelligent cache device 103. The computing device 601 may comprise a system bus 613. The system bus 613 may comprise one or more bus structures, including a memory bus or memory controller, a peripheral bus, an accelerated graphics port, and a processor or local bus using any of a variety of bus architectures. The architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description may also be implemented over a wired or wireless network connection and each of the subsystems, including the processor 603, a mass storage device 604, an operating system 605, content playback management software 606, content playback management data 607, a network adapter 608, system memory 612, an Input/Output Interface 610, a display adapter 609, a display device 611, and a human machine interface 602, may be contained within one or more remote computing devices 614a,b,c at physically separate locations, connected through buses of this form, in effect implementing a fully distributed system.

The computing device 601 may comprise a variety of computer readable media. Exemplary readable media may be any available media that is accessible by the computing device 601 and comprises, for example and not meant to be limiting, both volatile and non-volatile media, removable and non-removable media. The system memory 612 may comprise the intelligent cache. The system memory 612 comprises computer readable media in the form of volatile memory, such as random access memory (RAM), and/or non-volatile memory, such as read only memory (ROM). The system memory 612 may store data such as content playback management data 607 and/or program modules such as operating system 605 and content playback management software 606 that are immediately accessible to and/or are presently operated on by the processing unit 603.

The computing device 601 may comprise other removable/non-removable, volatile/non-volatile computer storage media. FIG. 6 shows a mass storage device 604 which may provide non-volatile storage of computer code, computer readable instructions, data structures, program modules, and other data for the computing device 601. For example and not meant to be limiting, a mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored in the mass storage device 604, including for example, an operating system 605 and content playback management software 606. Each of the operating system 605 and content playback management software 606 (or some combination thereof) may comprise elements of the programming and the content playback management software 606. Content playback management data 607 may also be stored in the mass storage device 604. Content playback management data 607 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

The user may enter commands and information into the computing device 601 via an input device (not shown). Examples of such input devices comprise, but are not limited to, a keyboard, a pointing device (e.g., a "mouse"), a microphone, a joystick, a scanner, tactile input devices such as gloves, and other body coverings, and the like. These and other input devices may be connected to the processing unit 603 via a human machine interface 602 that is coupled to the system bus 613, but may be connected by other interface and bus structures, such as a parallel port, game port, an IEEE 1394 Port (also known as a Firewire port), a serial port, or a universal serial bus (USB).

A display device 611 may also be connected to the system bus 613 via an interface, such as a display adapter 609. It is contemplated that the computing device 601 may have more than one display adapter 609 and the computing device 601 may have more than one display device 611. For example, a display device may be a monitor, an LCD (Liquid Crystal Display), or a projector. In addition to the display device 611, other output peripheral devices may comprise components such as speakers (not shown) and a printer (not shown) which may be connected to the computing device 601 via Input/Output Interface 610. Any step and/or result of the methods may be output in any form to an output device. Such output may be any form of visual representation, including, but not limited to, textual, graphical, animation, audio, tactile, and the like. The display 611 and computing device 601 may be part of one device, or separate devices.

The computing device 601 may operate in a networked environment using logical connections to one or more remote computing devices 614*a,b,c*. The remote computing devices 614*a,b,c*, may comprise one or more of the devices in FIG. 1. A remote computing device may be a personal computer, portable computer, a smart phone, a server, a router, a network computer, a peer device or other common network node, and so on. Logical connections between the computing device 601 and a remote computing device 614*a,b,c* may be made via a network 615, such as a local area network (LAN) and a general wide area network (WAN). Such network connections may be through a network adapter 608. A network adapter 608 may be implemented in both wired and wireless environments. Such networking environments are conventional and commonplace in dwellings, offices, enterprise-wide computer networks, intranets, and the Internet.

Application programs and other executable program components such as the operating system 605 are shown herein as discrete blocks, although it is recognized that such programs and components reside at various times in different storage components of the computing device 601, and are executed by the data processor(s) of the computer. An implementation of content playback management software 606 may be stored in or sent across some form of computer readable media. Any of the disclosed methods may be performed by computer readable instructions embodied on computer readable media. Computer readable media may be any available media that may be accessed by a computer. For example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed:

1. A method comprising:
   receiving, from a user device, a request to playback content on the user device;
   causing, based on the request, at least a portion of the content to be stored in a cache;
   receiving, from the user device, an indication of a trickplay command associated with playback of the content on the user device; and
   increasing, based on a type of the trickplay command, an amount of time the at least the portion of the content is stored in the cache, wherein the increasing the amount of time the at least the portion of the content is stored in the cache is based on determining, based on the type of the trickplay command, a probability of playback of the at least the portion of the content.

2. The method of claim 1, wherein the type of the trickplay command comprises at least one of a rewind command, a short rewind command, a long rewind command, a pause command, a stop command, or a tune command.

3. The method of claim 1, wherein the increasing the amount of time comprises causing at least a part of the at least the portion of the content stored in the cache to be evicted from the cache.

4. The method of claim 1, wherein the type of the trickplay command comprises a rewind command;
   wherein the method further comprises receiving an indication of another trickplay command comprising a play command; and
   wherein the increasing the amount of time is based on a gap between receiving the rewind command and receiving the play command.

5. The method of claim 1, wherein the cache comprises at least one of a memory, a storage device, a storage system, or a storage subsystem.

6. The method of claim 1, wherein the cache comprises a component of a computing device configured to perform the method.

7. The method of claim 1, wherein the determining the probability of playback of the at least the portion of the content further comprises determining whether an indication of an additional trickplay command is received during a period of time after receiving the indication of the trickplay command.

8. A method comprising:
   receiving, from a user device, a request to playback content on the user device;
   causing, based on the request, at least a portion of the content to be stored in a cache;
   receiving, from the user device, an indication of a trickplay command associated with playback of the content on the user device; and
   decreasing, based on a type of the trickplay command, an amount of time the at least the portion of the content is stored in the cache, wherein the decreasing the amount of time the at least the portion of the content is stored in the cache is based on determining, based on the type of the trickplay command, a probability of playback of the portion of the content.

9. The method of claim 8, wherein the type of the trickplay command comprises at least one of a fast forward command, a play command following a fast forward command, a stop command, or a tune command.

10. The method of claim 8, wherein the decreasing the amount of time comprises causing at least a part of the at least the portion of the content stored in the cache to be evicted from the cache.

11. The method of claim 8, wherein the decreasing the amount of time is further based on a previously received trickplay command.

12. The method of claim 8, wherein the cache comprises at least one of a memory, a storage device, a storage system, or a storage subsystem.

13. The method of claim 8, wherein the cache comprises a component of a computing device configured to perform the method.

14. A method comprising:
receiving, from a user device, a request to playback content on the user device;
causing, based on the request, output of at least a first portion of the content;
receiving, from the user device, an indication of a trickplay command associated with playback of the content on the user device; and
causing, based on a type of the trickplay command, at least a second portion of the content to be stored in a cache, wherein the second portion is different than the first portion, and wherein an amount of time the second portion of the content is stored in the cache is based on determining, based on the type of the trickplay command, a probability of playback of a second portion of the content.

15. The method of claim 14, wherein the type of the trickplay command comprises at least one of a fast forward command, a play command following a fast forward command, a pause command, a stop command, or a tune command.

16. The method of claim 14, wherein the type of the trickplay command comprises a fast forward command; and
wherein the at least the second portion of the content to be stored in the cache comprises a portion of the content asset to be played back based on receiving a rewind command.

17. The method of claim 14, wherein the type of the trickplay command comprises a fast forward command followed by a play command; and
wherein the portion of the content comprises a portion of the content associated with a playback time before a playback time associated with the play command.

18. The method of claim 14, wherein the cache comprises at least one of a memory, a storage device, a storage system, or a storage subsystem.

19. The method of claim 14, wherein the cache comprises a component of a computing device configured to perform the method.

20. The method of claim 14, wherein in response to the causing the at least the second portion of the content to be stored in the cache further comprises evicting at least a third portion of content from the cache.

* * * * *